United States Patent [19]

Coomer et al.

[11] Patent Number: 5,574,653
[45] Date of Patent: Nov. 12, 1996

[54] SWITCHBOARD

[75] Inventors: Ronald J. Coomer, Brackenridge; Graeme J. Wightman, The Gap, both of Australia

[73] Assignee: The South East Queensland Electricity Board, Brisbane, Australia

[21] Appl. No.: 372,843

[22] Filed: Jan. 13, 1995

Related U.S. Application Data

[63] Continuation of Ser. No. 965,386, filed as PCT/AU91/00269, Jun. 25, 1991 published as WO92/00624, Jan. 9, 1992, abandoned.

[30] Foreign Application Priority Data

Jun. 25, 1990 [AU] Australia ................... PK0777

[51] Int. Cl.[6] ............ G06F 15/56; G01R 22/00; H02J 3/00; H02H 7/26
[52] U.S. Cl. .......... 364/483; 364/480; 364/492; 361/115
[58] Field of Search ............. 364/480, 481, 364/483, 464.04, 492; 340/870.02, 870.03, 870.05, 538, 310.01; 324/110; 307/64, 87, 99, 326, 328; 323/299, 318; 361/114, 115

[56] References Cited

U.S. PATENT DOCUMENTS

| | | |
|---|---|---|
| 4,153,936 | 5/1979 | Schmitz ................... 364/493 |
| 4,384,213 | 5/1983 | Bogel ....................... 307/64 |
| 4,467,434 | 8/1984 | Hurley et al. ............ 364/483 |
| 4,644,320 | 2/1987 | Carr et al. ............... 340/310 A |
| 4,728,757 | 3/1988 | Buxton et al. .......... 200/50 AA |
| 4,803,632 | 2/1989 | Frew et al. .............. 364/464.04 |
| 4,804,957 | 2/1989 | Selph et al. ............. 340/870.03 |
| 4,926,282 | 5/1990 | McGhie .................... 361/102 |
| 4,964,058 | 10/1990 | Brown, Jr. ............... 364/492 |
| 4,996,646 | 2/1991 | Farrington .............. 364/483 |

FOREIGN PATENT DOCUMENTS

| | | |
|---|---|---|
| 5540780 | 8/1980 | Australia . |
| 6844181 | 10/1981 | Australia . |
| 1096788 | 8/1988 | Australia . |
| 8909456 | 10/1989 | WIPO . |

*Primary Examiner*—Ellis B. Ramirez
*Assistant Examiner*—M. Kemper
*Attorney, Agent, or Firm*—Renner, Otto, Boisselle & Sklar

[57] ABSTRACT

A switchboard having a mains power input circuit (A,N) and a plurality of output circuits (HOT WATER, OFF PEAK, OVEN, LIGHT, POWER2, POWER1) and including a central processing unit (CPU) for controlling a plurality of controllable circuit breakers (BREAKER1 to BREAKER6). The breakers are controllable by the CPU. Sensing means (J14, T2, T4) provide the CPU with instantaneous voltage and current magnitudes to enable the CPU to determine power consumed by the output circuits.

30 Claims, 16 Drawing Sheets

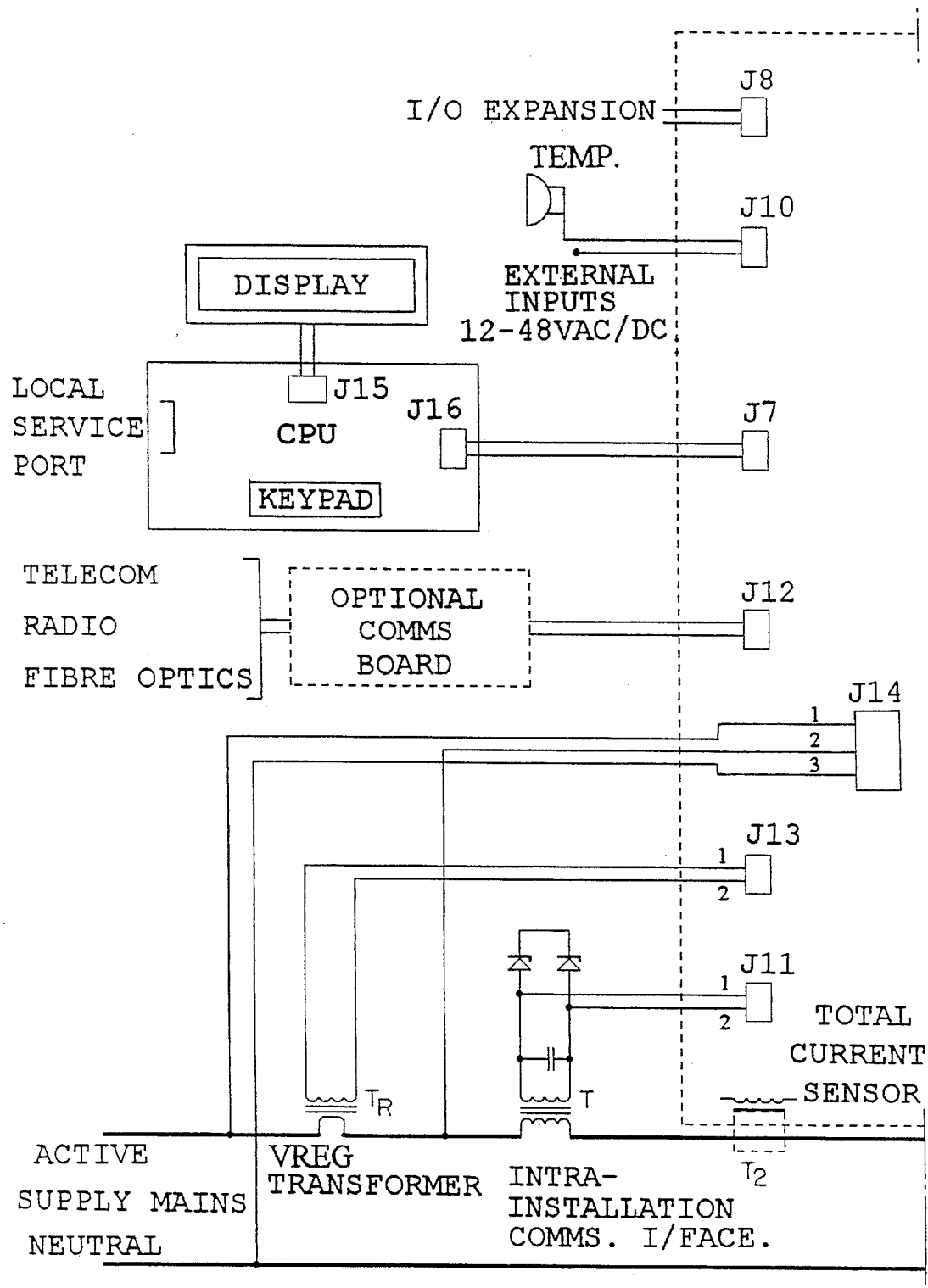
FIG. IA

SWITCHBOARD

This is a continuation of application Ser. No. 07/965,386 filed on Dec. 14, 1992, now abandoned International Application PCT/AU91/00269 filed on Jun. 25, 1991 published as WO92/00624, Jan. 9, 1992 and which designated the U.S.

This invention relates to a switchboard and low voltage network automation system.

Domestic and small commercial electricity consumer installations are typically supplied with electric power in the following manner.

Low voltage AC power is made available at a local transformer which feeds power by low voltage mains wiring in the street adjacent to the consumer premises. This mains wiring may be either overhead wiring or underground and usually comprises three phase wires and a neutral wire which is earthed at multiple points.

Each consumer typically has a consumer switchboard in the form of a housing having a meter for determining power consumption for circuits coupled to a general power or lighting tariff and a meter for determining off peak power consumption typically for water heating. The power and lighting circuits coupled to the first meter are provided with fuses or circuit breakers and power is then distributed through the consumer's premises. An earth leakage circuit breaker (safety switch or residual current device) may be associated with one or more power or lighting circuits and the second meter may have a load control relay associated with it for governing on/off periods of supply for off peak supply of power.

Usually the metering and sometimes the load control equipment is supplied by the utility and the switchboard housing and circuit protection is supplied by the consumer. The installation of such consumer switchboards is labour intensive and considerable time is required to complete the wiring. In addition because two watthour meters and a load control relay are required, switchboards of this type are generally large in size, Watthour meters and load control relays are expensive and this cost becomes an added cost which needs to be passed on to the consumer by the supply authority.

Consumer switchboards of this type do not readily lend themselves to economical remote reading of the meters or power consumed at various times of the day or night. The meters must be periodically read manually by meter readers so that the consumer can be billed. For this reason the switchboard must either be mounted externally of the consumers premises or be accessible to the meter reader or be split so that the metering and load control equipment is external to the consumers premises and the circuit breakers and other equipment is located inside the consumer premises.

Consumer switchboards of this type do not readily lend themselves to remote disconnection or reconnection of supply to the consumer or give any indication of the quality of supply of power to the consumer. They also give no indication when power has been lost to the consumer and the supply authority has to wait until the consumer notifies it of the problem before any action can be taken to rectify the problem.

Consumer switchboards of this type do not readily lend themselves to the protection of equipment in the consumer installation from overvoltage or undervoltage conditions or from voltage surges or transients which may appear from time to time on the low voltage mains wiring.

Consumer switchboards of this type do not readily lend themselves to enabling the consumer to program them to limit the demand of the consumer installation in response to time of use tariff incentives from the supply authority and the consumer lifestyle requirements.

Consumer switchboards of this type do not readily lend themselves to automatically respond in real time to generation system emergencies by shedding selected circuits when the frequency of the power supply drops below certain critical limits.

Each local transformer typically has a transformer switchboard containing maximum demand indicators for determining the maximum current on each circuit from the transformer and a number of switches and fuses for limiting the flow of power to the low voltage mains wiring.

Transformer switchboards containing maximum demand indicators are costly to read manually and reset and are not readily suited to being remotely read. They provide only limited information on the power consumption in the low voltage area fed from the transformer and the loading on the transformer. Typically 1 to 2 percent of this power is stolen by consumers bypassing or tampering with metering at their premises. This power theft cannot be detected by the maximum demand indicators in the transformer switchboard and costly investigation crews are needed to audit consumers consumption to determine when theft is occurring. Inaccuracy in metering at the consumer installation cannot readily be established employing maximum demand indicators.

Transformer switchboards containing fuses are costly to replace and may cause unbalances in supply when one of these fuses- interrupts the flow of power. These switchboards also do not readily lend themselves to remote switching for automation of the low voltage network.

Conventional networks containing a local transformer switchboard and a number of consumer switchboards often suffer from voltage balance and regulation problems at the switchboards at various times of the day. This often causes the supply voltage to exceed the statutory limits and gives rise to excessive voltages on the neutral conductor which can lead to electric shock complaints from consumers who have poor earthing on their installations.

To overcome these problems and minimise local system losses mains wiring is usually larger than necessary to carry the power to each consumer after the effects of diversity have been accounted for. These conventional networks usually have no means of balancing the loading on the low voltage mains wiring to ensure voltage regulation, or locally limiting power demand to minimise system losses which are typically between 2 to 4 percent of the power delivered to the consumer.

It is the object of the present invention to provide a switchboard which at least minimises the disadvantages referred to above.

According to an aspect of the invention there is provided a switchboard containing one or more mains power input circuits and a plurality of power output circuits and including a central processing unit (CPU), a plurality of controllable circuit breakers operable independently of each other, each for controlling an associated power output circuit, said breakers being operable independently of the CPU and each including tripping means for automatically tripping when the magnitude of the current flowing through them exceeds a preset value, said breakers also being controllable by said CPU, sensing means for providing said CPU with the instantaneous value of the voltage of the one or more mains power input circuits coupled to the switchboard and one or more current sensors for providing said CPU with the instantaneous value of current drawn by various said output circuits of the switchboard.

The switchboard may also have provision for earth leakage current sensing.

It is preferred that the switchboard include communication circuitry to provide for power line carrier two way communication between the supply authority and the user or consumer. The CPU controls the reception and transmission of communication signals indicative of control signals sent by the authority for controlling the circuit breakers and/or sensing their status, providing display and input of information and periodic earth leakage test signals as well as for transmission of signals indicative of power consumption.

It is preferred that the switchboard have an external input for providing an audible alarm. That input may be processed by the CPU to provide an alarm signal to the supply authority or utility.

If desired, the switchboard may have provision for receiving/transmitting control signals and information via the telephone network, radio transmission or fibre optic transmission.

The switchboard may have two current sensors—one for sensing the total current drawn by the switchboard and the other for sensing the current drawn by one of the user circuits. Typically that one user circuit may be the circuit for supplying off peak power to the user for say hot water heating. The sensors may either be shunt elements or current transformers. Current transformers are preferred. The breakers may be constructed such that should either the authority or the user trip any of the breakers then the other party is unable to reset the breakers. This provides a measure of safety interlock. The breakers may be located remotely of the other components of the switchboard.

The voltage supplied to the consumer is sensed for various purposes. These are for audio frequency lead control (ripple control) and to monitor the frequency of the voltage supplied to the consumer.

A preferred embodiment of the invention will now be described with reference to the drawings in which:

FIGS. 1A and 1B together are representative of a block diagram of a switchboard of the invention from a structural point of view;

Figure 1B:
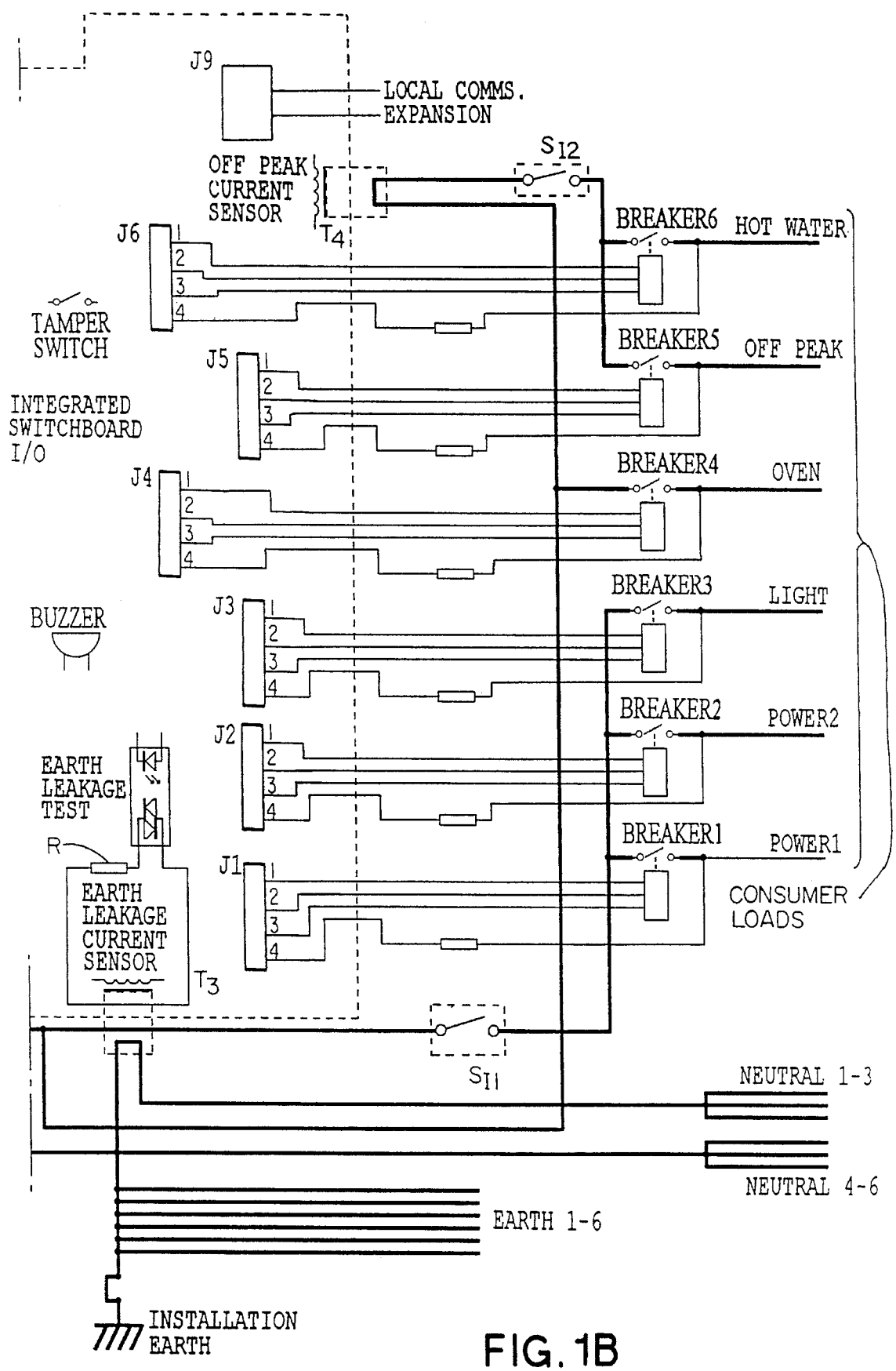

FIGS. 1A and 1B together show a structural block diagram of the switchboard of an embodiment of the invention. Power from the supply installation or utility is presented on active and neutral lines as shown. A plurality of neutral and earth lines are made available to the consumer. The active line is split to provide six consumer circuits identified as POWER 1, POWER 2, LIGHT, OVEN, OFF-PEAK and HOT WATER. Each of the consumer circuits has associated with it a controllable switch or circuit breaker 1 to 6, and the circuit breakers are both manually operable and electrically controllable via signals supplied to them from connectors J1 and J6. These breakers are coupled to connectors J1 to J6 respectively. The circuit breakers are adjustable to enable the user to preset the tripping current level. A resistor is in series with one terminal of each connector J1 to J6 and the respective breaker.

The switchboard has an earth leakage sensor associated with a transformer T3 having a secondary winding and the active, test line and neutral line form single turn primary windings. Sensor can be internally tested by the OPTO coupler shown by causing a current to flow on the test line. Current limit Resistor R is in series with the OPTO coupler to set the minimum current for this test.

Communication facilities are provided to enable the utility or supply authority to communicate with the switchboard for control and monitoring purposes. The connector J14 enables signals sent by the utility to be received by the switchboard or the switchboard to send signals to the utility. If desired communication may also be achieved via radio, fibre optics or over a telephone network by using an optional communication board linked to connector J12. In the exemplary embodiment, the communication facilities use amplitude modulation.

Transformer T2 (TOTCT) enables the switchboard to obtain an indication of total current flowing on the active line. The voltage across the active and neutral line is sensed and made available to connector. J14. A further transformer T4 (OFF PEAK CT) enables the magnitude of the current supplied to the HOT WATER circuit to be determined.

The switchboard has a connector J10 for enabling consumer external inputs to be supplied to it. These inputs may be for monitoring temperature, security monitoring or other consumer requirements to be conveyed to the switchboard.

The switchboard has a CPU coupled to connector J7. The CPU has a DISPLAY and KEYPAD and functions to supervise and control the operation of the switchboard at the consumer installation. The CPU contains program means for controlling outputs in response to inputs for controlling the power to the output circuits.

The optional possibility for I/O expansion is provided at connector JS. The temperature of local equipment can be sensed by sensor TEMP. Typically the temperature of the hot water heater will be sensed. A buzzer provides for the possibility of an audible alarm. Tamper switch can detect unauthorised removal of a cover of the switchboard. The CPU may have an Optional local service port as shown. Preferably the equipment linked to this port is electrically isolated.

The transformer T enables intelligent appliances supplied with power by the breakers to communicate with the switchboard and vice versa. Transformer T is coupled to connector J11.

Isolation switch S11 enables the light and power output circuits to be manually isolated. Isolation switch S12 enables the hot water and off peak circuits to be isolated.

FIG. 1B shows diagrammatically how a status signal, which indicates the state of the circuit breaker, is secured from each circuit breaker. A status line extends from the load side of each circuit breaker to terminal 4 of each connector J1 to J6. FIG. 4B shows greater detail of how this status signal is derived. Terminal 4 of the connectors J1 and J6 is coupled to respective parallel connected resistors and 5.1 v zener diodes to provide status signals STATUS 1 to STATUS 6. These signals are made available to register U7 in FIG. 4C which in turn, makes these and other inputs to it available to the CPU U17.

Figure 2:
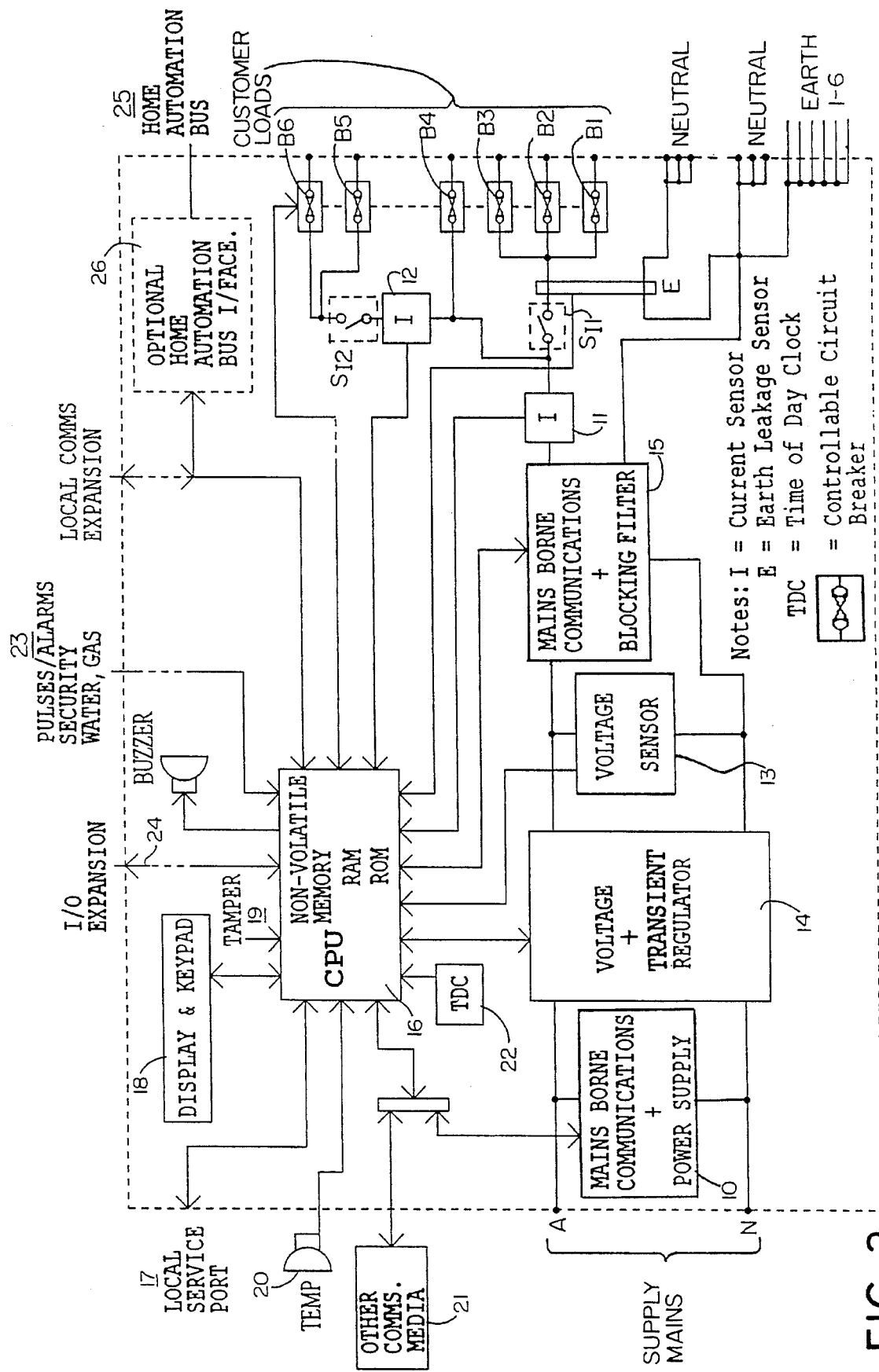
FIG. 2 is representative of a block diagram of the switchboard from a functional point of view.

FIG. 2 shows a block diagram of the switchboard from a functional point of view. The utility active and neutral are supplied at A and N. Block 10 is representative of the two Way communication facility between the utility and the switchboard and a power supply for the various components of the switchboard. The power supplied to the consumer via breakers 1 to 6 B1 to B6 and earth/neutral lines has its total current sensed by block 11 and the circuit supplied by breaker B5 has its current sensed by block 12. The voltage to the consumer is sensed by sensor 13 following voltage and transient regulation in block 14 to ensure a desired voltage level is maintained. Block 14 includes a voltage regulator having a transient limiting device operating independently of the CPU for limiting the level of transient voltage. A communication/filtering block 15 enables the consumer to communicate with the CPU 16 and, if allowed by the CPU, with the utility. The CPU 16 has memory and receives various inputs such as from a local port 17, display/keypad 18, a tamper switch 19, temperature sensor 20, optional communications block 21, real time or time of day clock 22, local communication expansion 23, external inputs 24 as well as controlling and sensing breaker states, monitoring sensor 13 and regulator 14. In addition to this a home automation bus 25 may be provided as an option and a bus interface 26 for coupling this bus to the CPU 16. Isolation switches SI1 and 2 previously described are also illustrated in FIG. 2.

Figure 3A:
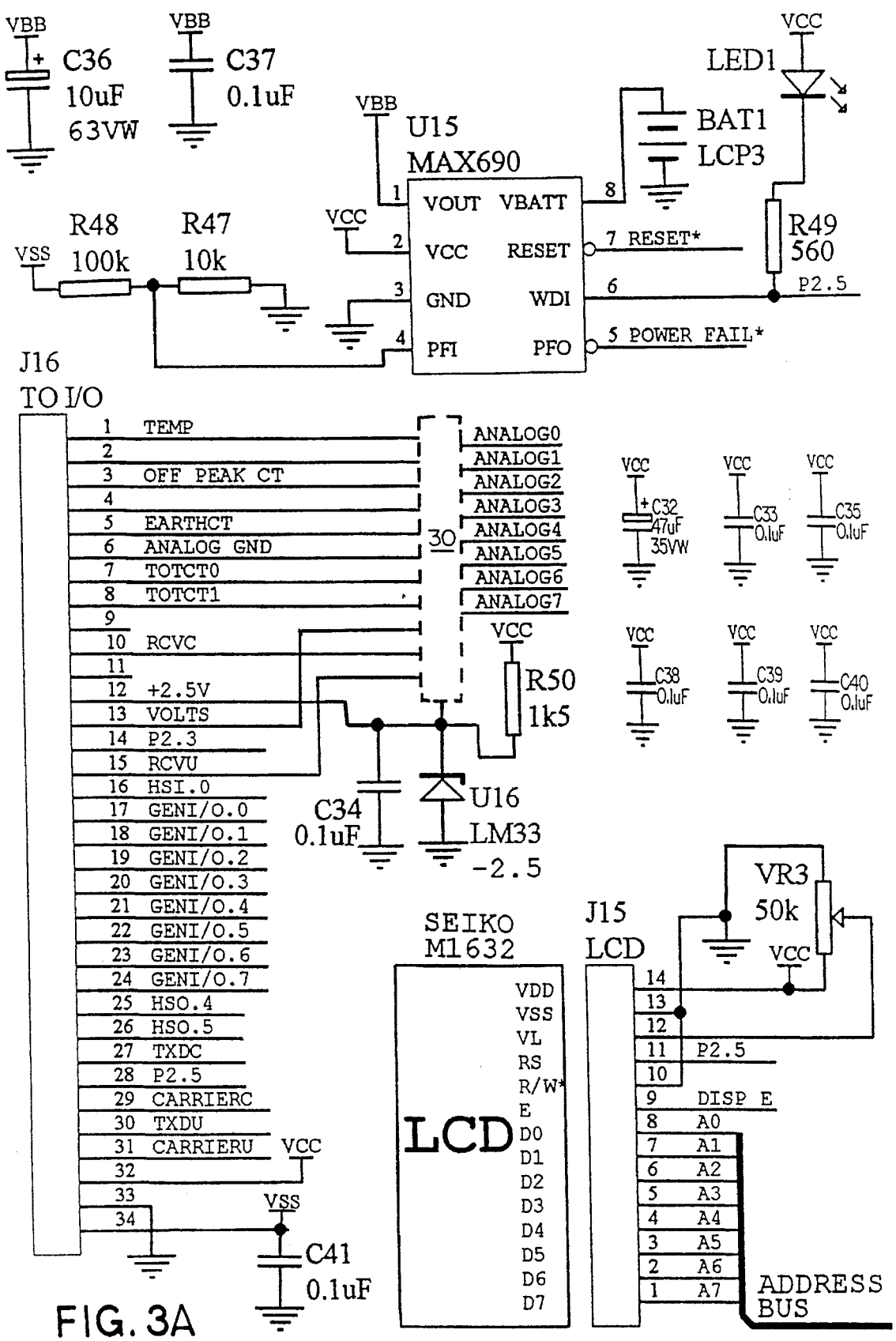
FIG. 3A is a detailed circuit diagram of part of a CPU board of the switchboard of the invention.
Figure 4A:
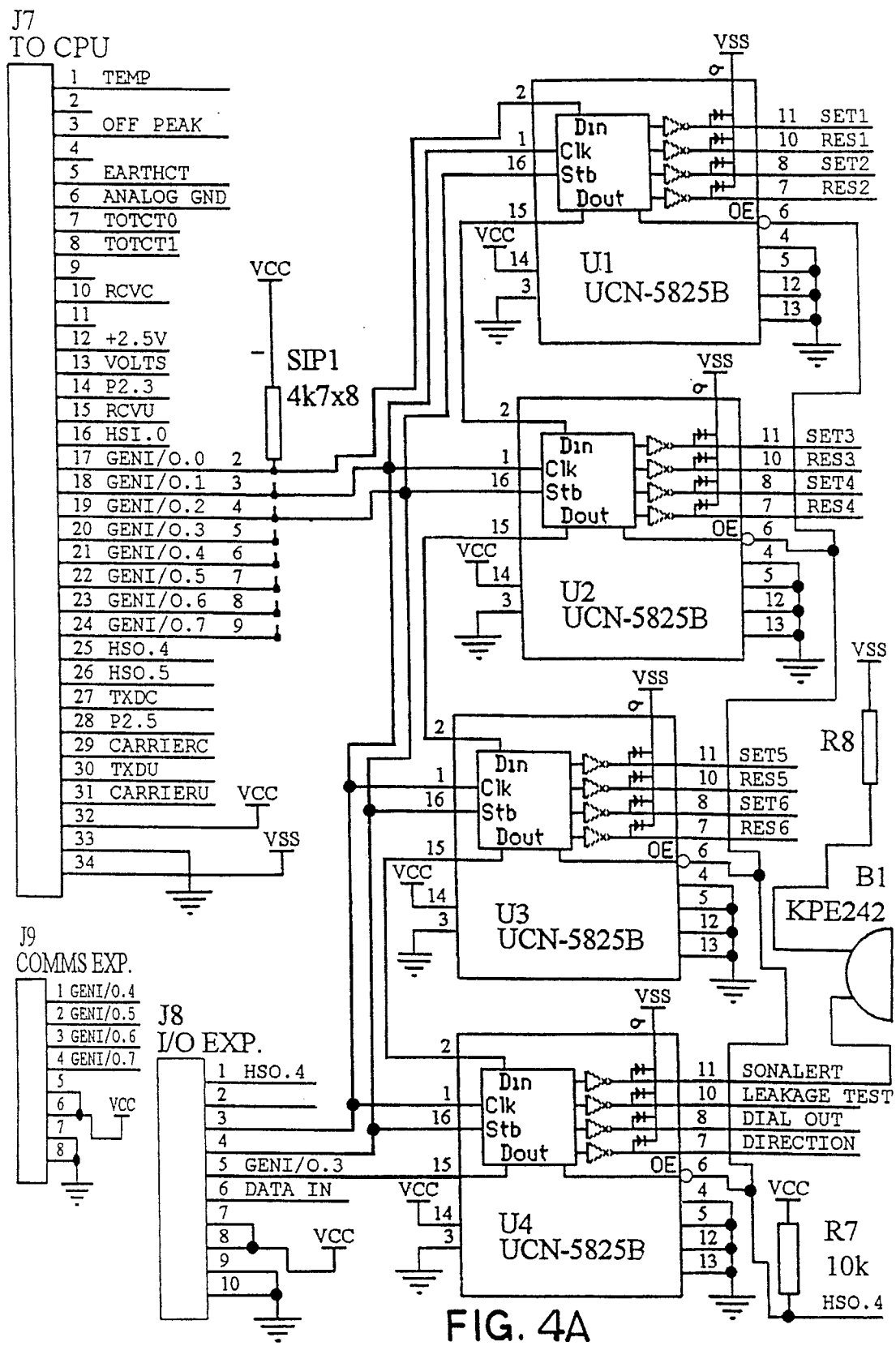
FIG. 4A is a detailed circuit diagram of part of an input/output circuit of the switchboard of the invention.
Figure 4B:
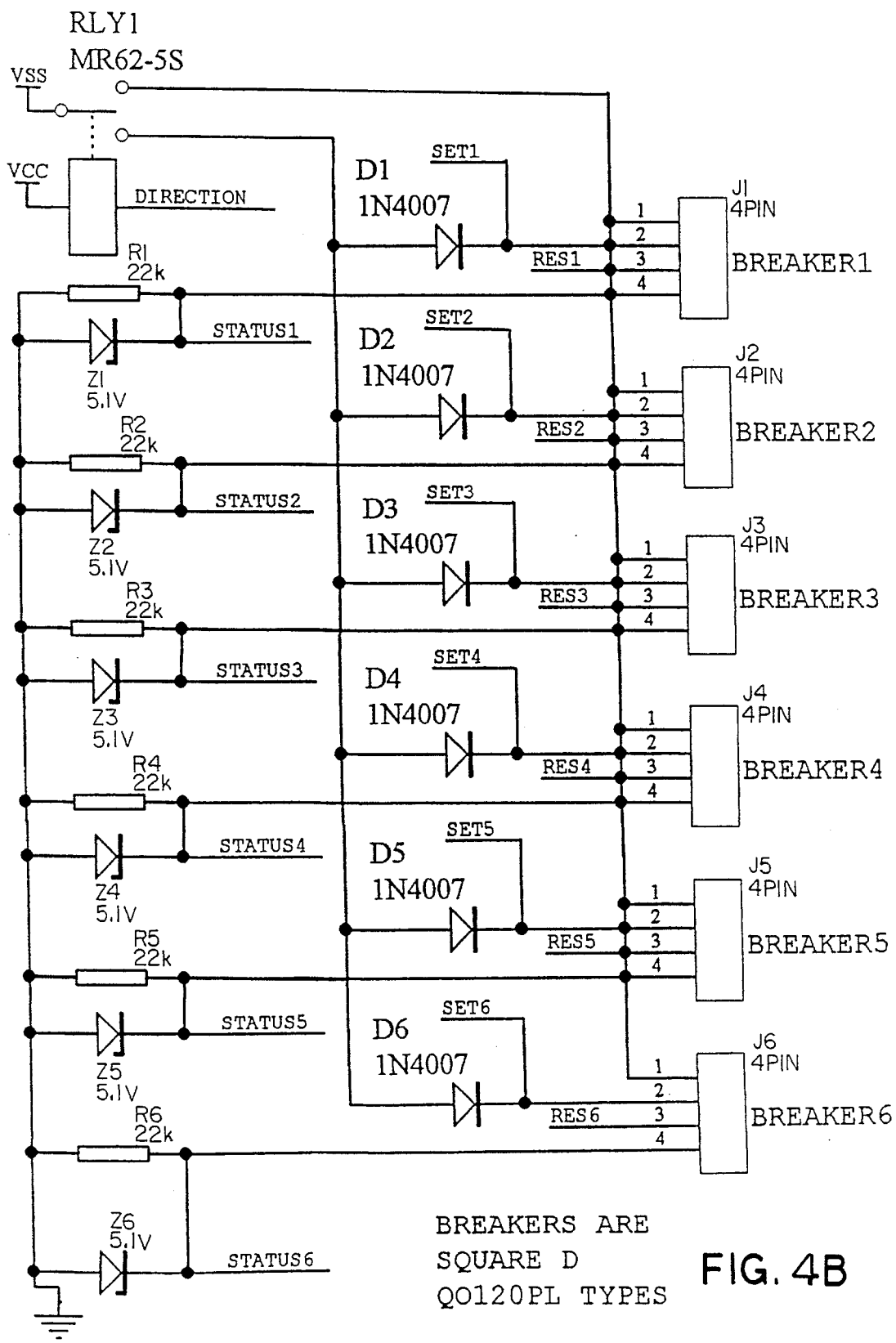
FIG. 4B is a detailed circuit diagram of another part of the input/output circuit of the switchboard of the invention.
Figure 4C:
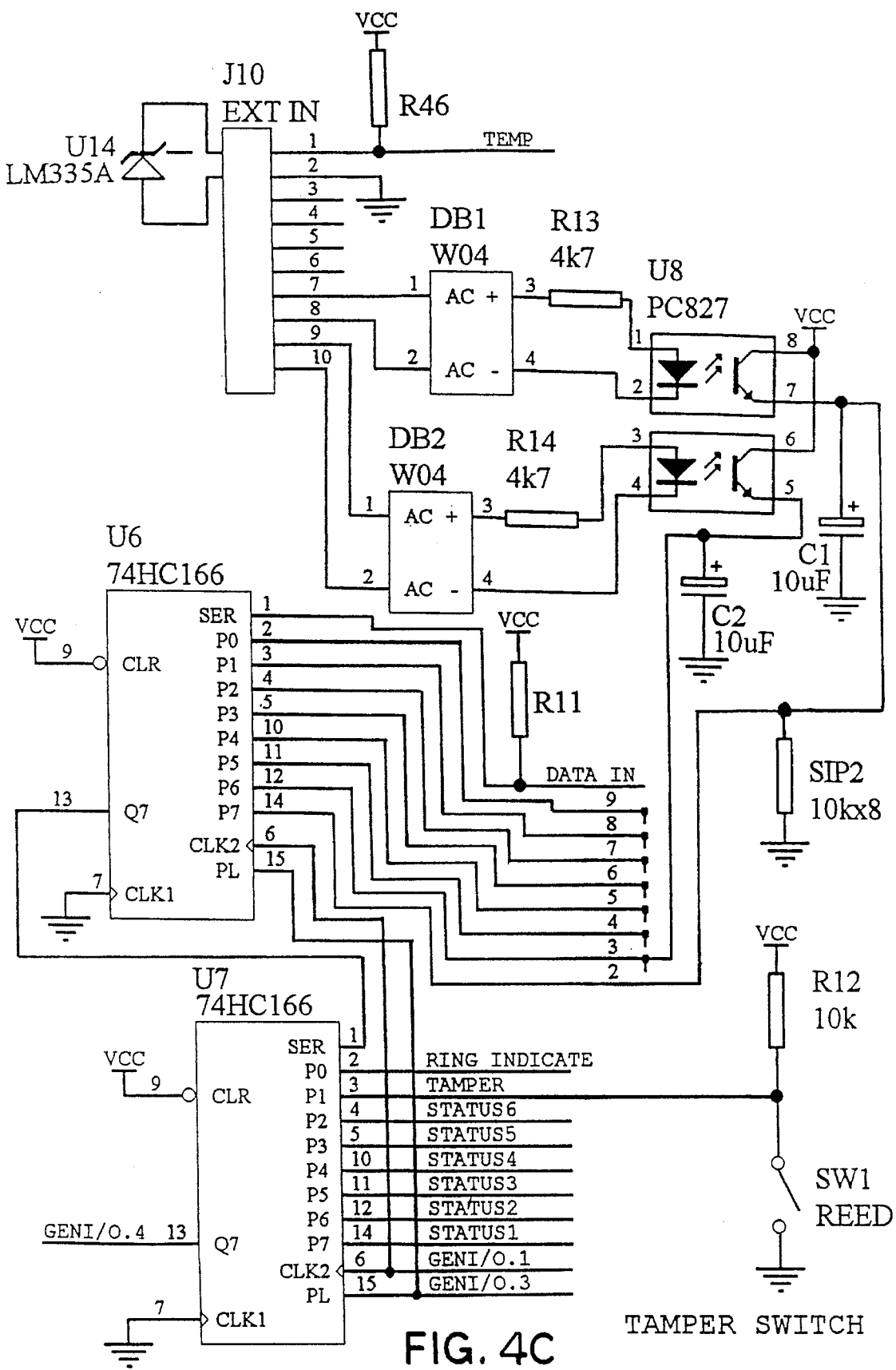
FIG. 4C is a detailed circuit diagram of yet another part of the input/output circuit of the switchboard of the invention.

The computer is able to access external devices via connector J8 shown in FIG. 1A and shown in greater detail in FIG. 4A. This connector enables external devices to be accessed by the computer. Connector J10 functions to make an external temperature signal and external inputs available to the computer. The connector J10 is shown in greater detail in FIG. 4C. The temperature signal of FIG. 4C is coupled to connector J7 (see FIG. 4A) and then to computer U17 via connector J16 (see FIG. 3A). This is one of the ways in which the computer may access external devices to provide other services and control functions.

FIGS. 3A to 3D should be considered together since they all relate to circuits concerned with the CPU. The capacitors C32 to C41 are bypass capacitors. Block U15 is a watch dog timer and back-up power supply controller for the CPU U17 (see FIG. 3B) to ensure that data stored by RAM U21 is not lost if power fails or drops below a predetermined level. Battery BAT1 is a lithium back-up power source. Indicator LED1 flashes to indicate proper operation when line P2.5 is periodically pulsed by the CPU U17. If no pulse is present then U15 provides a reset signal to reset the CPU U17. The power fail output of U15 goes low when the power voltage drops or fails and provides an input to CPU U17 at pin 7 (NMI). Resistors R48 and R47 sense the supply voltage level/presence for proper function of the watch dog timer U15.

Connector J16 enables the CPU circuits to be coupled to INPUT/OUTPUT (I/O circuits via connector J7 (see FIG. 4A). Block 30 includes within it the filtering circuits of FIG. 3D. This Block 30 is coupled to connector J16 as is CPU U17 shown in FIG. 3B. Connector J15 enables the address bus of FIG. 3B to be coupled to the display LCD.

Figure 3B:
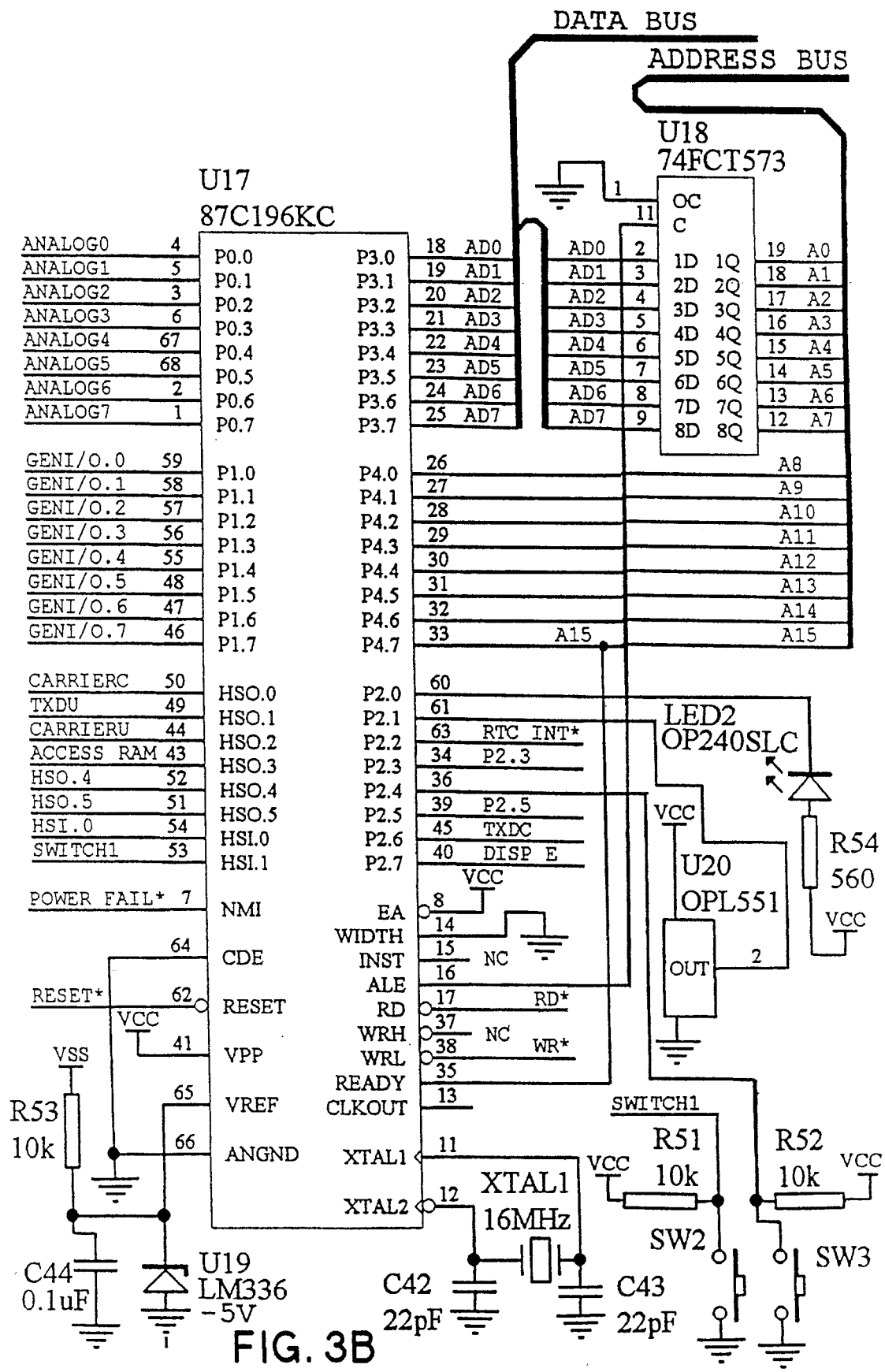
FIG. 3B is a detailed circuit diagram of another part of the CPU board of the switchboard of the invention.

In FIG. 3B the CPU U17 is shown having various I/O ports, address bus and data bus. LED 2 is coupled to a local service port for enabling U17 to transmit data to the local service port. OPTO receiver U20 enables U17 to receive data from the local service port.

The keypad mentioned in relation to FIGS. 1A and 1B is provided by switches SW2 and SW3. The network consisting of R53, C44 and diode U19 provides a 5 volt reference for U17. Crystal XTAL1 provides a timing clock for U17. Device U18 is an address bus latch.

Figure 3C:
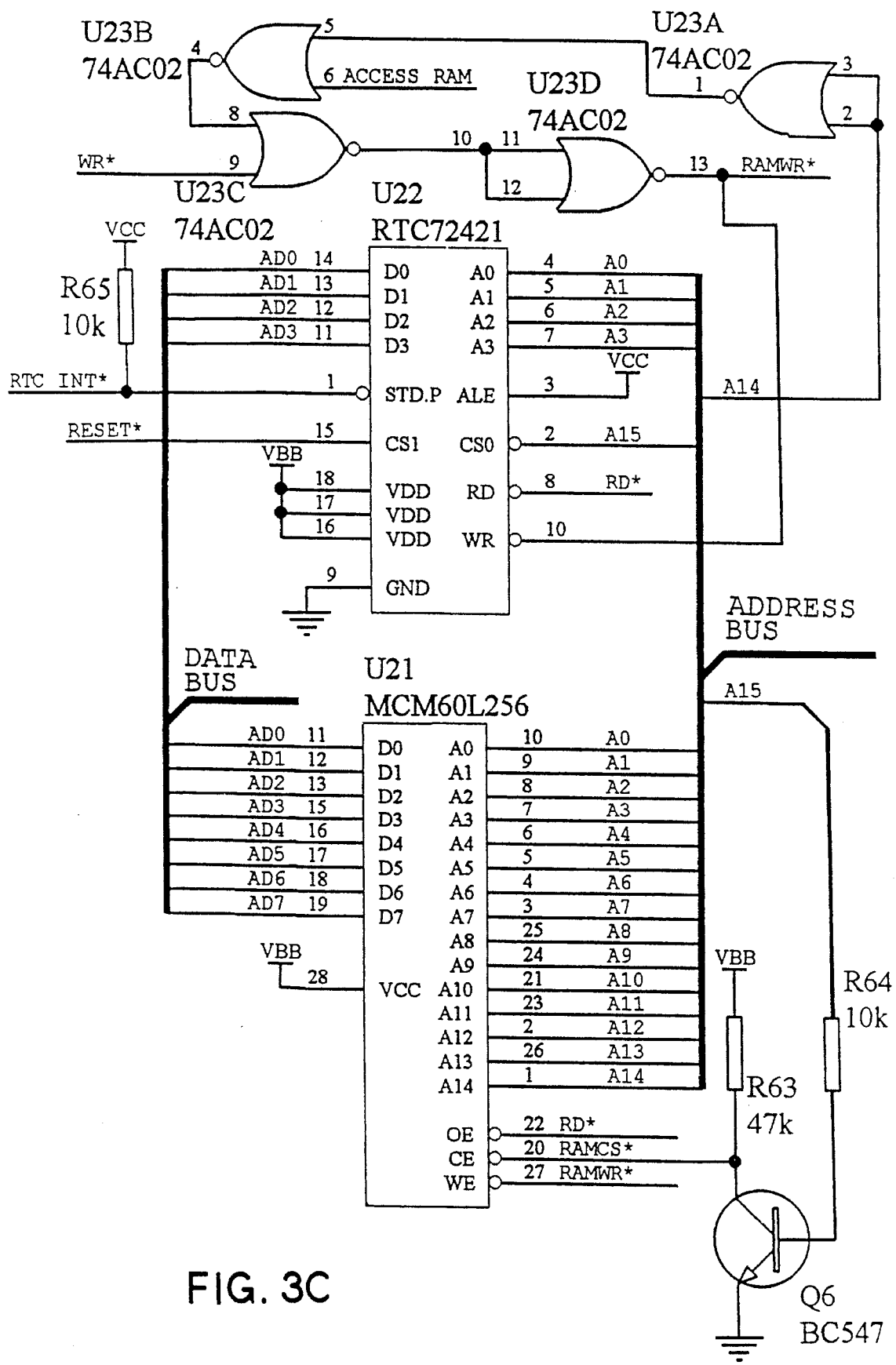
FIG. 3C is a detailed circuit diagram of yet another part of the CPU board of the switchboard of the invention.

FIG. 3C shows a real time or time of day clock U22, RAM chip U21 and control circuit U23 A, B, C, D and Q6 for controlling the writing of data to the RAM U21. RAM U21 is a 32K memory device and is controlled in two halves by U23 and Q6 to ensure that half of the memory is write protected. NOR gates U23 enable the respective halves of U21 to be accessed while Q6 enables the RAM U21. Resistor R65 is a pull up resistor.

The real time clock can be accessed by the computer via the data bus and the address bus and employed by the computer when arriving at a calculation of energy consumption and for the timing of events in real time.

Figure 3D:
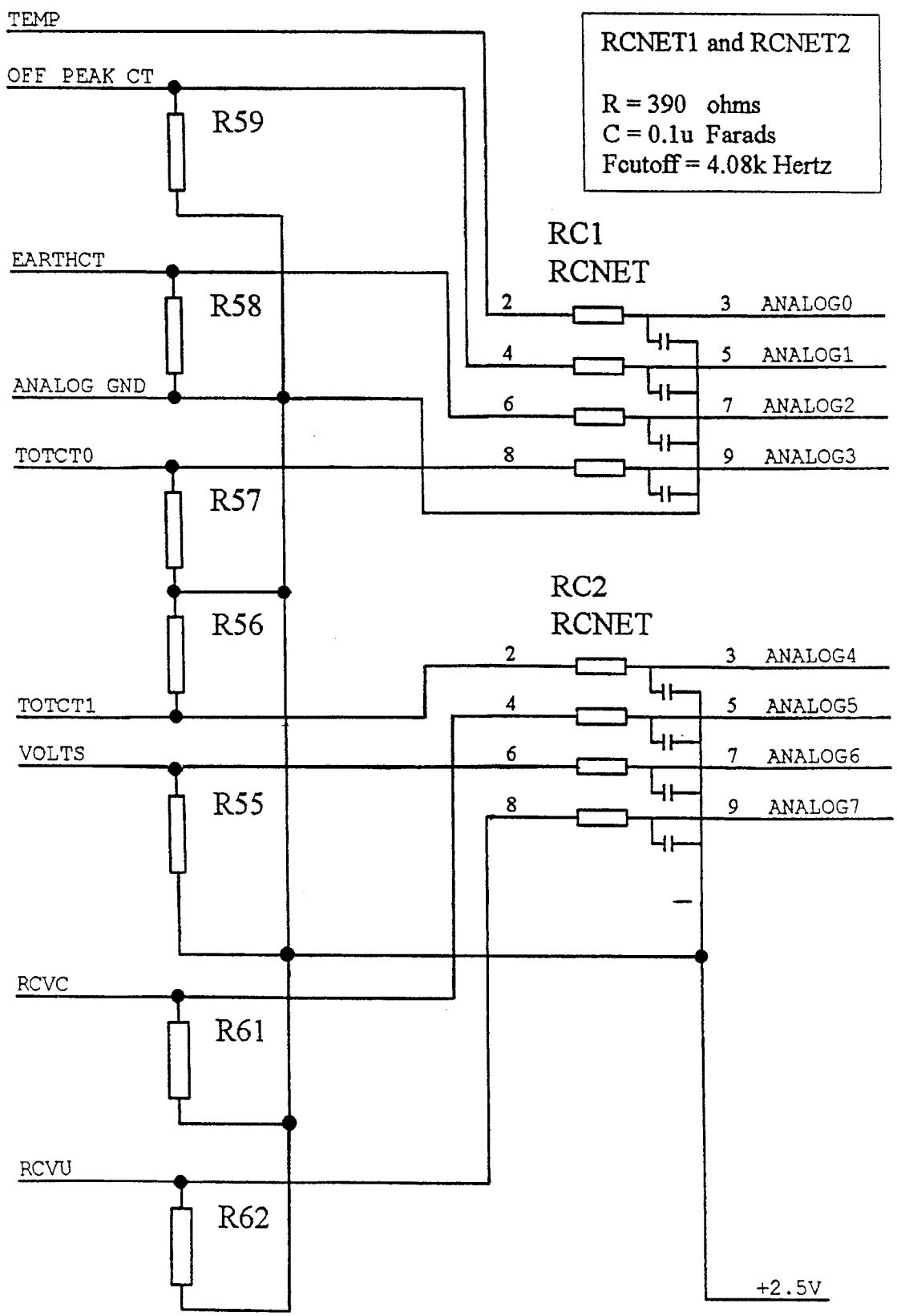
FIG. 3D is a detailed circuit diagram of a final part of the CPU board of the switchboard of the invention.

FIG. 3D shows a filtering circuit for conditioning inputs received from the temperature sensor, hot water current transformer T4, OFFPEAK CT, earth leakage transformer T3 EARTHCT, total current sensor transformer TOTCT, voltage sensor input VOLTS, customer communication receive signal RCVC, utility communication receive signal RCVU and provide these analog signals as inputs ANALOG 0–7 for the CPU U17. Resistors R55 to 59 and 61, 62 are shunt resistors necessary to provide a voltage signal for low pass filters RC1 and 2.

FIG. 4A shows an I/O circuit-connector J7 which is coupled to J16 of FIG. 3A. Network SIP1 (shown diagrammatically) provides pull up resistors for the identified I/O input port. Connector J9 is the local communications expansion connector shown in FIG. 1A and B and is coupled to various I/O inputs. Connector J8 is the I/O expansion connector of FIG. 1A and B. Devices U1 to U5 are serial connected latched shift registers. In this circuit U5 need not be used and is spare. Registers U1 to U3 provide set and reset signals for controlling breakers 1 to 6 while register U4 provides an alarm signal to buzzer B1, leakage test signal for testing the earth leakage sensor, a dial output and direction signals for circuit breaker control.

FIG. 4B shows a circuit for controlling breakers 1 to 6. Direction relay RLY1 controls the polarity of the switching signal supplied to the breakers 1 to 6 while diodes D1 to D6 provide for compatibility between set drive signals and the breakers 1 to 6. Status and reset signals are respectively secured from and supplied to the breakers. The status signals are conditioned by Zener diodes Z1 to Z6 and resistors R1 to R6.

In FIG. 4C connector J10 enables the switchboard to receive two or more external inputs say within the range 12–48 VAC/DC from the consumer and one of which inputs is a temperature input. The temperature input includes pull up Resistor R46. The inputs are full wave rectified in bridges DB1, DB2 and a dual OPTO isolator U8 couples the signals to latched shift register U6 for supplying the signal to the CPU U17. Register U6 may be used to provide for expansion of external inputs at pin 1 by connecting another like shift register to the "data in" line. Register U6 is in series with register U7 and U7 receives the tamper indicating input, status inputs and two I/O inputs. An optional ring indicate input may also be supplied. Temperature sensor U14 is coupled to connector J10.

Tamper switch SW1 is shown and may normally be shut when the switchboard cover is in place. Should the cover be removed SW1 opens and a high signal (Vcc) is applied to pin P3 of register U7 and to the CPU 17 by the register U7. The switch SW1 could be a reed switch, an optical sensor or the like.

Figure 4D:
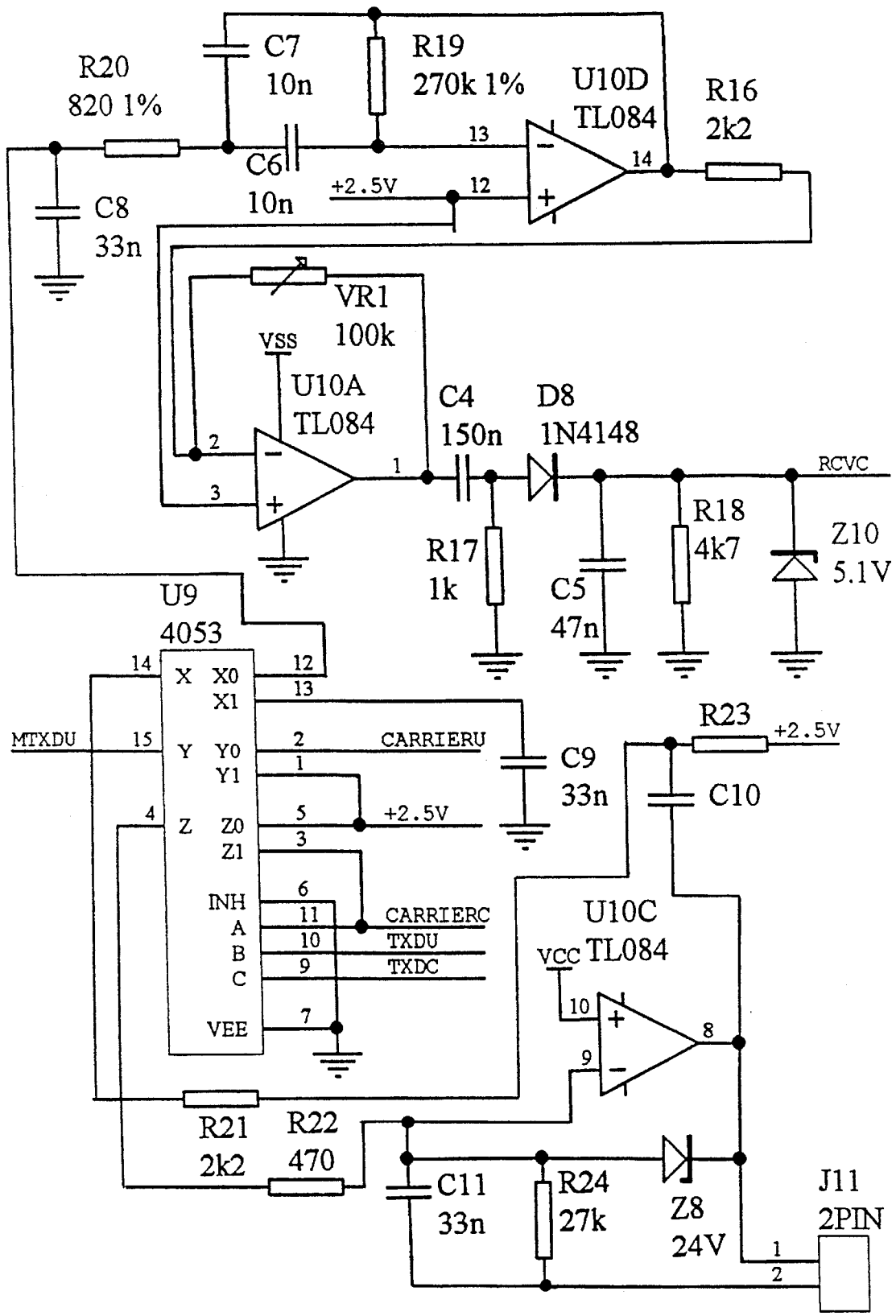
FIG. 4D is a detailed circuit diagram of a communications circuit of the switchboard of the invention.

FIGS. 4D and E should be considered together as these circuits facilitate communication between the consumer and the CPU and, if allowed by the CPU communication by the consumer may be translated to the utility. These circuits also enable the utility to communicate with the CPU and hence the switchboard and vice versa. Communication between the consumer and the CPU is typically at a high frequency such as about 100 KHz while communication between the utility and the switchboard is at a low frequency typically between 3–5 KHz.

When an appliance at the consumer installation wishes to communicate, a signal may appear on the circuit supplying power to one of the breakers and appears across transformer T. Capacitor C3 provides a high frequency short circuit and prevents the signal from travelling up the mains. The connector J11 receives the signal from the secondary winding of transformer T and the receiving circuit including device U10C receives the signal at a high input impedance and the received signal is applied to pin 14 of bi-directional mixer U9. Mixer U9 mixes the CARRIERC signal with the received signal at pin 14 to provide sum and difference signals at pins 12 and 13. Capacitor C9 balances the signals at pins 12 and 13. The signal an pin 12 is coupled to band pass filter U10D, amplified in amplifier U10A, rectified by diode D8, limited by diode Z10 and the received signal RCVC obtained for connection CPU17.

When the CPU17 wishes to communicate with an appliance of the consumer a signal TXDC is applied by CPU17 to pin 9 of mixer U9. This is modulated between 2.5 V and CARRIERC by U9 and the mixed transmitted data for the consumer from pin 4 of U9 applied to U10C for transmission at a low impedance and made available to connector J11 and impressed on the active line and the circuits coupled to the breakers and thus to the consumer appliance.

Communication from the utility via the mains at 3–5 KHz is possible via connector J14. The mains communication signal is high pass filtered by C17 and R31, applied to band pass filter U11D, amplified by amplifier U11A, rectified by diode D9 and made available via connector J12 and a link (as shown) as a received signal KCVU for CPU17. Diode Z13 provides limiting.

When CPU17 wishes to transmit signals to the utility the CARRIERU is mixed by U9 with 2.5 V and a MTXDU signal made available at pin 15 of U9. The mixing is initiated by the TXDU signal at pin 10 of U9. The MTXDU signal is connected via connector J12 and the link shown to amplifier/buffer U11C and Q1, Q2, to surge protecting diodes D11, D10, decoupled by C28 and R34, limited by diodes Z15, Z16 and applied to transformer T1 and onto the mains via J14.

Figure 4E:
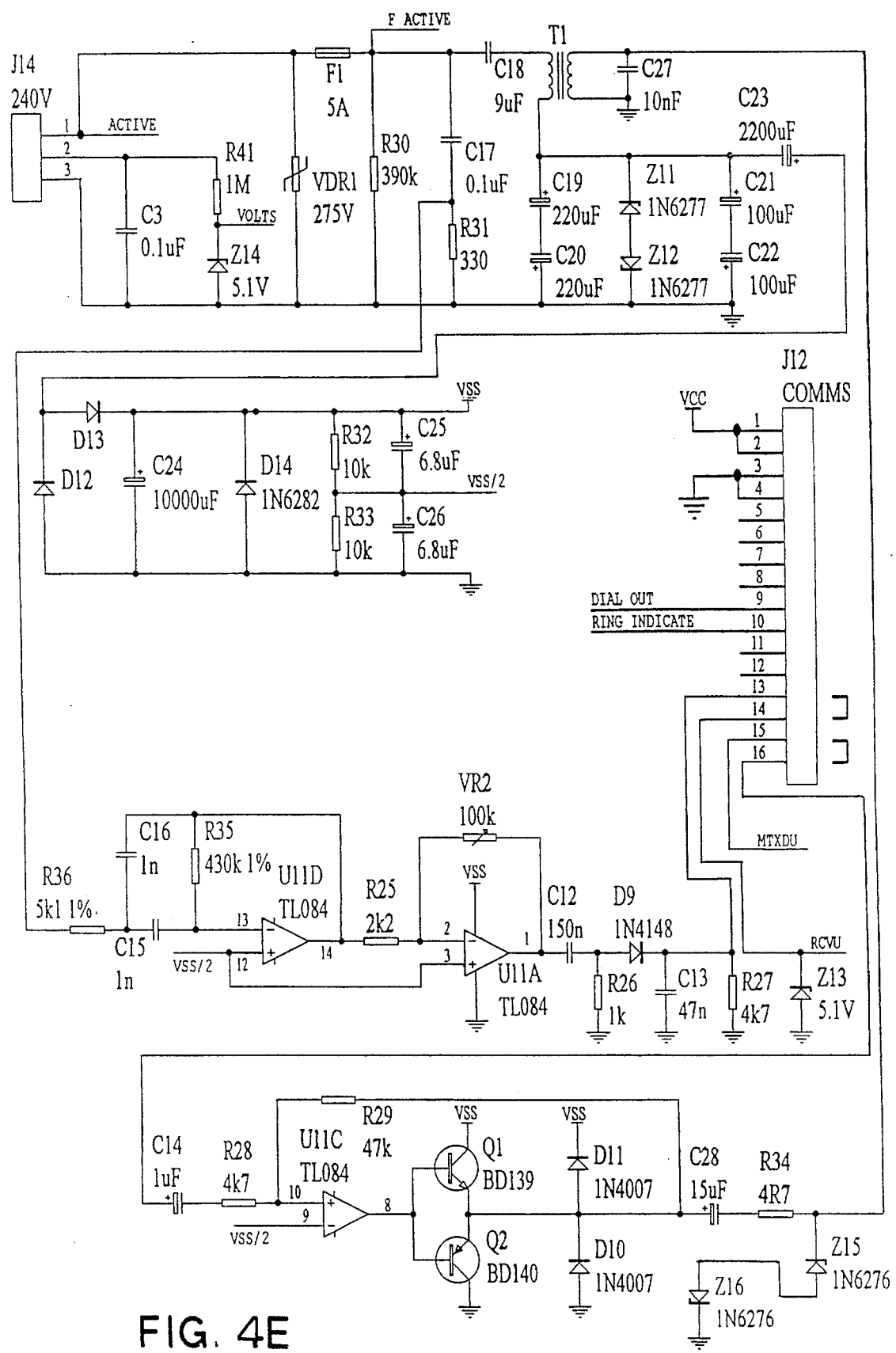
FIG. 4E is a detailed circuit diagram of a further communications circuit, regulator and power supply circuit of the switchboard of the invention.

FIG. 4E also includes a power supply comprising filter capacitors C19 to C22, limiters Z11, Z12, rectifying diodes D12, D13 and other components to provide a voltage Vcc. The DIAL OUT and RING INDICATE connections to connector J12 are optional and are not used in this embodiment.

Diode Z14 and resistor 41 coupled to connector J14 provide the VOLTS signal i.e. the sensed supply voltage for the CPU to enable the CPU to provide a signal at HSO.5 to control Q5.

In FIG. 4C resistor R46 together with diode U14 provide an analog signal representative of the temperature sensed at the switchboard. This TEMP signal is supplied to J7 and then via J16 (see FIG. 1A) to the CPU as the analog Ø input.

Figure 4F:
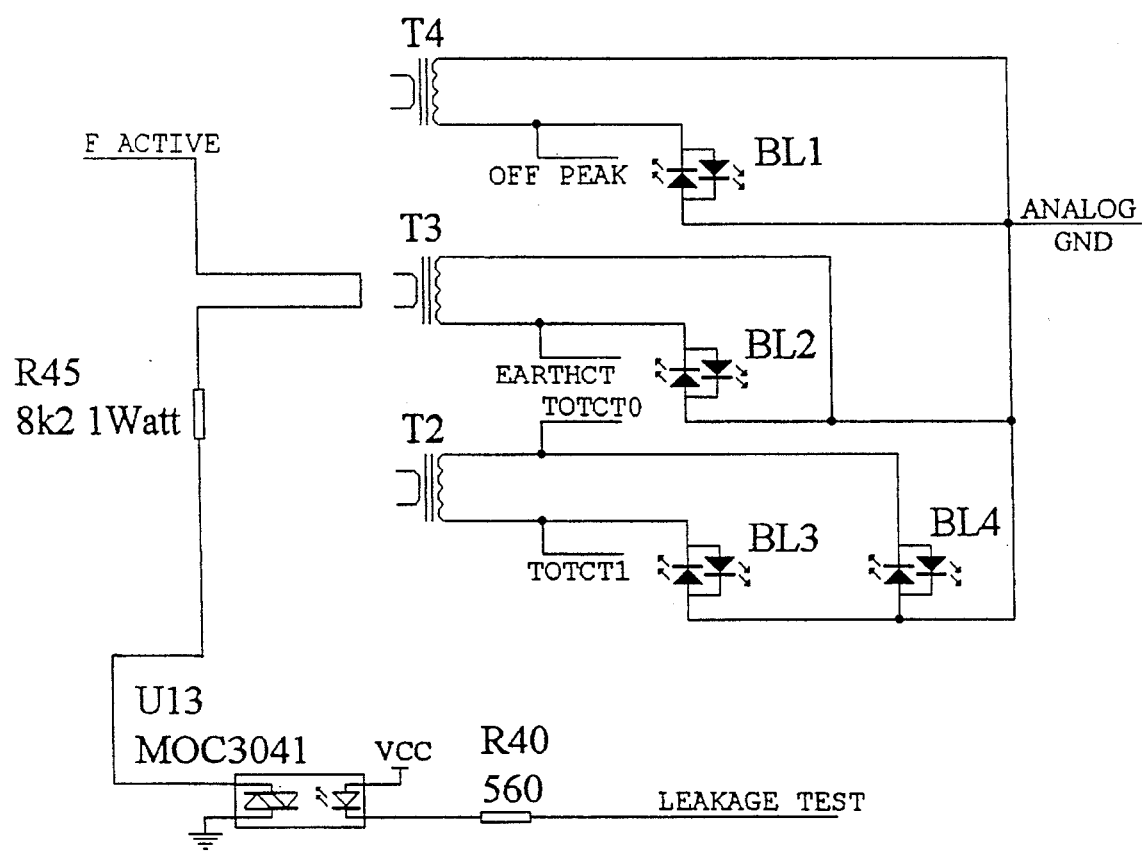
FIG. 4F is a detailed circuit diagram of a further input/output circuit of the switchboard of the invention.

FIG. 4F shows how an earth leakage test signal from the CPU can be supplied via OPTO coupler U13 to transformer T3. Transformer T4 (OFFPEAK CT) provides at terminal OFFPEAK a connection point for enabling a signal representative of current drawn by the OFFPEAK circuits to be obtained for connection to connector J7/J8 and supplied to FIG. 3D. Similarly earth leakage signal EARTHCT is obtained from the secondary of T3 and total current signals TOTCTØ and 1 are obtained from the secondary of T2 and made available to FIG. 3D. Diodes BL1 to 4 provide protection to prevent damage should the secondary windings of the transformers T2 to T4 be open circuited.

Figure 4G:
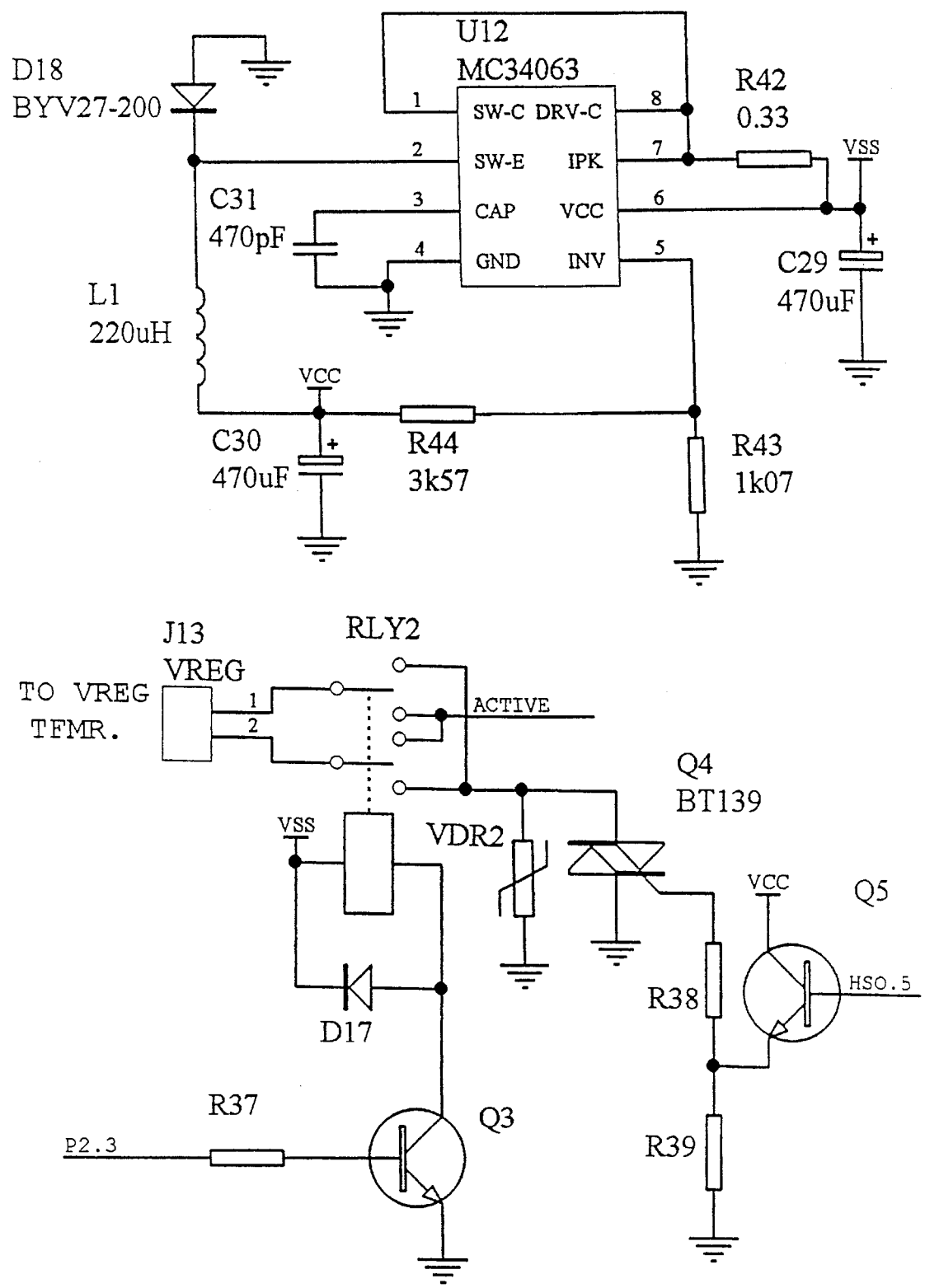
FIG. 4G is a detailed circuit diagram of a power supply voltage sensor and a voltage regulator of the switchboard of the invention.

FIG. 4G shows a switched mode power supply U12 for providing +5 V at Vcc from a +30 V supply. The voltage regulator for regulating the consumer supply voltage is a phase controlled transformer (see block 14 of FIG. 2), and has a connector J13 coupled to a transformer winding of the transformer which is connected in series with the TRIAC Q4 and across the active and neutral lines. A further winding of the transformer is in series with the active line. Relay RLY2 together with TRIAC Q4 controls the phasing and the manner in which the voltages across these windings are combined to regulate the voltage supplied to the consumer. This combining only occurs when a signal is present at the base of Q5 to gate the triac Q4. The signal at the base of Q3 enables the relay to be energized. The winding in series with the active line is a heavy current low voltage winding and the other is mains supply voltage winding. The relay controls the way in which the windings are combined to result in summation or subtraction of the respective voltages while the duration for each part of the mains frequency cycle for which the combining occurs is controlled by signal HSO.5.

With the switchboard of the invention the authority can provide consumers with this fully tested 6 circuit switchboard, including earth leakage protection, at significantly reduced cost, and have in place the necessary facilities for future Network Automation/Management schemes using flexible Time-of-Use tariffs with two-way communication. The switchboard is constructed to meet IP34 requirements and is suitable for mounting indoors or outdoors. It can perform the following functions in "stand alone" mode:

Metering
   2 meters with multiple independent registers for time of day, demand import or export metering.
Protection
   Overcurrent Trip
   Earth Leakage Trip (programmable)
   Underfrequency Shed with soft restoration
   Under/Over Voltage trip
Load Control
   Ripple Telegram Receiver(adaptive)
   Programmable Time Clock
   Energy Management (Demand Limiting)
   Programmable security lighting
Monitoring
   Quality of Supply (volts out of limits)
   Loss of Supply
   Load Surveys
   Waveform Recording
   Tamper and Event Logging
   Temperature monitoring
   External Input for Alarms or Pulses
Supply voltage regulation The switchboard contains comprehensive two-way communication facilities with a unique network addressing scheme using software based adaptive modems to enable it to be networked to a central facility via many communication media including:

Power Line Carrier (inbuilt)

Telecom (Public Switched Network)

Radio (voice frequency or RS232)

Other future (fibre optic, etc.)

This provides remote programming and interrogation and enables the following additional functions to be performed:

Remote Disconnect/Reconnect

Credit Management (remote billing and payment)

Consumer services enquiries

Product/service advertising

The switchboard also has programmable communication facilities for the "Smart House" of the future can be programmed by the consumer for simple Home Automation sequences.

Figure 5A:
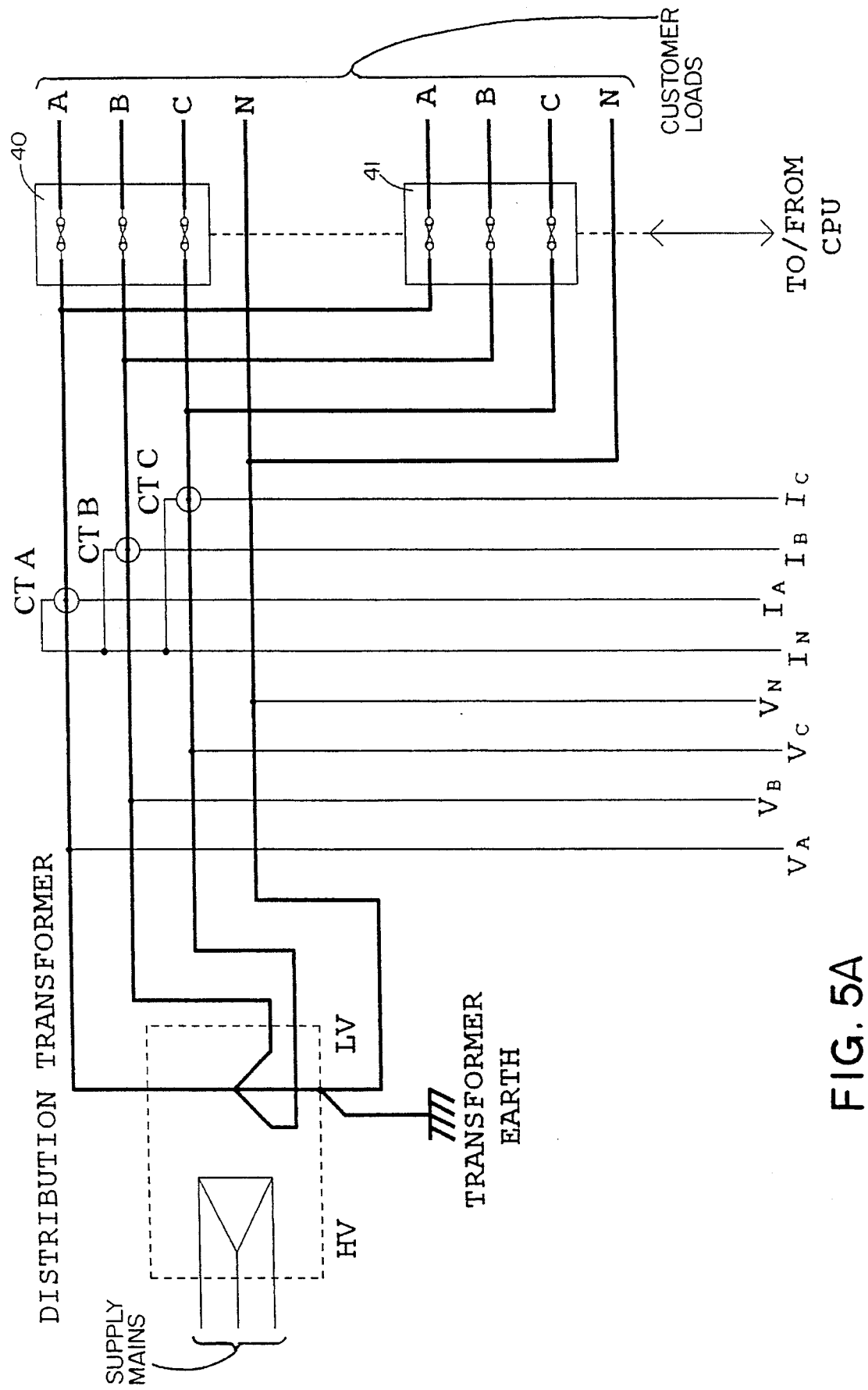
FIG. 5A is a line diagram of part of a three phase switchboard according to an embodiment of the invention.

FIG. 5A shows a distribution transformer, the low voltage side of which supplies three phase power to a consumer via lines A, B, C and neutral N. Controllable circuit breakers or switches in blocks 40, 41 enable various consumer circuits to be supplied with power. Each consumer line A, B, C, N has its voltage and current sensed for metering and other purposes. These sensing taps or connections provide signals VA, VB, VC, VN, IN, IA, IB, and IC. Breakers 40, 41 derive control signals from a CPU.

Figure 5B:
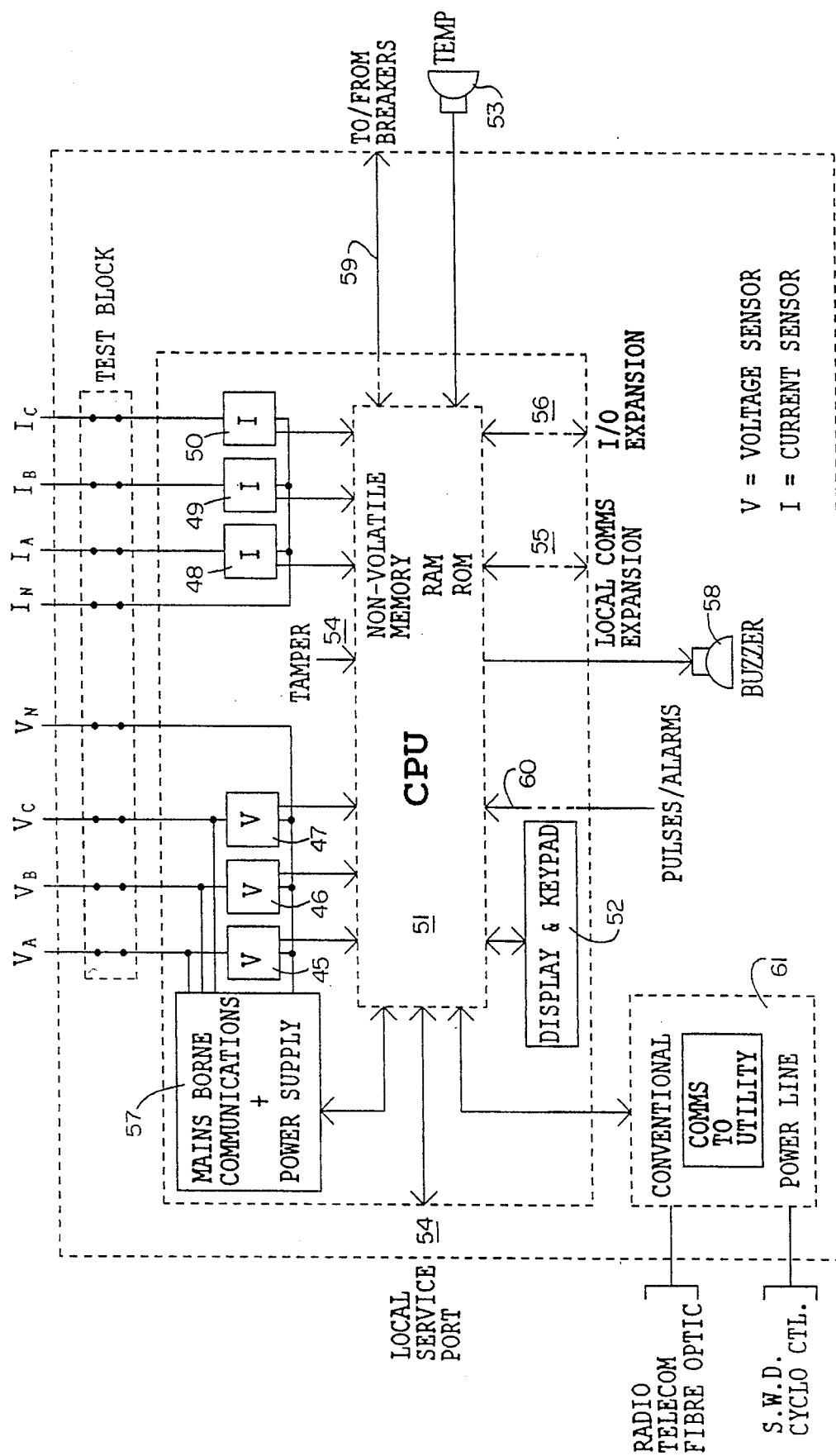
FIG. 5B is a functional block diagram like that of FIG. 2 but for a three phase switchboard.

FIG. 5B is a functional block diagram for a switchboard similar to that shown in FIG. 2 except that it is intended for a three phase system. Each phase voltage and current is sensed by voltage sensors 45, 46, 47 and 48, 49, 50 respectively. These signals are supplied to a CPU51. The CPU51 has associated with in a display and keypad 52 and receives a temperature input from temperature sensor 53 and a tamper input 54 from a tamper switch (not shown).

Information, signals and communications such as from a local service port 54, local communication expansion port, I/O expansion port 56 and mains borne communication from block 57. An audible alarm is provided by buzzer 58. The breakers are controlled by line 59 and the CPU can receive alarm inputs at 60. Communication may also be achieved by block 61.

For a system the switchboard at the transformer may be like that of FIGS. 5A and 5B and the switchboard at the consumers like that of FIGS. 1A to 4G. If the consumer is supplied with single phase power then the switchboard of FIGS. 1A to 4G can be Used. If the consumer is supplied with two or three phase power then two or three switchboards like that of FIGS. 1A to 4G can be used. Alternatively for three phase supply the switchboard may be as shown in FIGS. 5A and B.

The switchboard at the transformer may be the master for communication and control purposes and it communicates via conventional means to the utility. Alternatively the switchboard at the transformer could be the communication slave and one of the switchboards at a consumer installation could be the master.

Communication via the power line enables the following functions to be performed:

Remote "real time" network investigations and surveys

Power theft detection

Detection of meter inaccuracies

Load balancing and load-management

Network mapping.

We claim:

1. A switchboard containing one single phase or multi-phase power input circuit and a plurality of associated single or multi-phase power output circuits and including:

a central processing unit (CPU) having an input for receiving control information from a source external to said switchboard, a plurality of controllable circuit breakers capable of tripping and closing independently of each other, each for controlling the flow of power to an associated one of the power output circuits, each said circuit breaker being closable and trippable manually or under the control of the CPU and with independent tripping means for automatically tripping the circuit breaker when a magnitude of the current flowing through it exceeds a preset value and each said circuit breaker including interlocking means to prevent closing of the circuit breaker by the CPU when the circuit breaker has tripped independently of the CPU and to prevent manual closing of the circuit breaker when the circuit breaker has been tripped by the CPU as a function of said control information, sensing means for providing said CPU with an instantaneous value of the voltage of the one or more of the said power circuits, and sensing means for providing said CPU with an instantaneous value of the current flowing in one or more of the said power circuits.

2. The switchboard of claim 1 including earth leakage sensing means for providing said CPU with an indication of a magnitude of earth leakage current in the one or more of the output circuits.

3. The switchboard of claim 2 including output means to enable the CPU to inject a test current into the earth leakage sensing means for testing the operation of the earth leakage sensing means.

4. The switchboard of claim 1, including a display and a keypad for displaying and inputting user information at the switchboard or remotely therefrom.

5. The switchboard of claim 4 wherein said tripping means is adjustable for enabling the preset value to be varied.

6. The switchboard of claim 1 wherein said switchboard is modular in construction and said circuit breakers removably coupled to the switchboard.

7. The switchboard of claim 1 including breaker sensing means for providing the CPU with an indication of the state of the circuit breakers.

8. The switchboard of claim 1 including a voltage regulator for enabling the CPU to regulate a magnitude of the voltage on the one or more said output circuits.

9. The switchboard of claim 8 wherein said voltage regulator includes a phase controlled transformer.

10. The switchboard of claim 8 in which said voltage regulator includes a transient limiting device operating independently of the CPU for limiting the level of transient voltage.

11. The switchboard of claim 1 including two way communication means for enabling the CPU to communicate with equipment remote from the consumer installation.

12. The switchboard of claim 1 including two way communication means for transmitting signals on the active power line for enabling the CPU to communicate with equipment remote from the consumer installation.

13. The switchboard of claim 12 in which the two way communication means uses amplitude modulation.

14. The switchboard of claim 1 including inbound communication means for enabling the CPU to communicate with equipment inside the consumer installation.

15. The switchboard of claim 14 including high frequency blocking means for preventing communication signals from passing into the mains circuits.

16. The switchboard of claim 1 including one or more service communication means for enabling the CPU to access local or external devices for programming, interrogation, control or other services.

17. The switchboard of claim 16 including isolation between the switchboard and the external devices.

18. The switchboard of claim 1 including input/output expansion means for enabling the CPU to access additional local or external input/output devices.

19. The switchboard of claim 1 including input sensing means to enable the CPU to detect pulses or alarms from local or external devices.

20. The switchboard of claim 1 including a real time clock for enabling the CPU to determine, log and control timing of events and calculate energy consumption during various time periods.

21. The switchboard of claim 1 including a temperature sensor for enabling the CPU to determine the temperature of local or external equipment.

22. The switchboard of claim 1 including a tamper sensing means for enabling the CPU to detect interference with the switchboard.

23. The switchboard of claim 1 including audible output means for enabling the CPU to indicate alarm conditions.

24. The switchboard of claim 1 in which the CPU calculates watt and watt hour consumption to determine energy consumption by the output circuits.

25. The switchboard of claim 1 wherein said CPU includes audio frequency detection means for detecting the magnitude and coding of audio frequency or ripple control signals impressed on the active power input circuits.

26. The switchboard of claim 1 wherein said CPU includes mains frequency detection means for determining the frequency of the voltage on the active power input circuits.

27. The switchboard of claim 1 in which the CPU includes non-volatile memory for enabling data and program information to be retained when the active power input is removed from the switchboard.

28. The switchboard of claim 1 wherein said CPU contains program means for controlling outputs in response to inputs for controlling the power to the output circuits.

29. A system including a plurality of consumer installations and a supply installation and having a switchboard of claim 1 associated with each said installation in which one said switchboard operates as a master to poll and/or control the other said switchboards as slaves.

30. The system of claim 29 wherein said CPU's include detection means for enabling the detection of power theft and meter inaccuracies.

* * * * *